United States Patent [19]

Inoue et al.

[11] Patent Number: 5,244,967
[45] Date of Patent: Sep. 14, 1993

[54] SILICONE RUBBER COMPOSITION AND SILICONE RUBBER

[75] Inventors: Yoshio Inoue; Masaharu Takahashi; Ken-ichi Takita; Takeo Yoshida, all of Annaka, Japan

[73] Assignee: Shin-Etsu Chemical Co., Ltd., Tokyo, Japan

[21] Appl. No.: 594,948

[22] Filed: Oct. 10, 1990

[30] Foreign Application Priority Data

Oct. 20, 1989 [JP] Japan .................................. 1-273342

[51] Int. Cl.⁵ .............................................. C08L 83/00
[52] U.S. Cl. .................................... 524/588; 524/263; 524/265; 524/730; 524/731; 528/24; 528/41; 528/42
[58] Field of Search ............... 524/263, 265, 730, 731, 524/588; 528/41, 42, 24

[56] References Cited

U.S. PATENT DOCUMENTS

| | | | |
|---|---|---|---|
| 3,109,013 | 10/1963 | Haluska | 528/901 |
| 3,474,064 | 10/1969 | Hittmair et al. | 528/901 |
| 3,549,744 | 12/1970 | Compton | 264/300 |
| 4,384,100 | 5/1983 | Takamizawa et al. | 528/41 |
| 4,780,338 | 10/1988 | Saad et al. | 528/41 |

OTHER PUBLICATIONS

Noll, Chemistry and Technology of Silicones, Academic Press, pp. 211 and 212, (1968).

Primary Examiner—Melvyn I. Marquis
Attorney, Agent, or Firm—Birch, Stewart, Kolasch & Birch

[57] ABSTRACT

Silicone rubber compositions based on an organopolysiloxane are improved in release properties by blending a silane having both a fluorinated hydrocarbon group and an alkanoyloxy group and/or an organopolysiloxane having an alkanoyloxy or alkanoyloxyalkyl group.

14 Claims, 1 Drawing Sheet

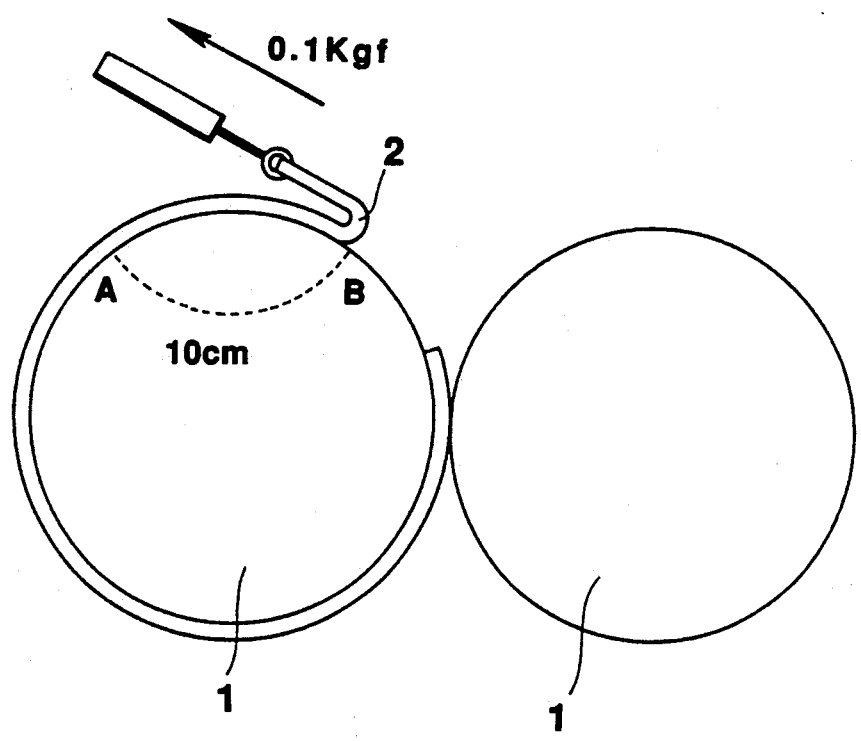

SILICONE RUBBER COMPOSITION AND SILICONE RUBBER

The present invention relates to a silicone rubber composition and silicone rubber obtained by vulcanizing the same.

BACKGROUND OF THE INVENTION

Silicone rubbers have been widely used in diverse applications for heat resistance, low-temperature resistance, and electrical properties. They are processed by any desired one of the various conventional methods depending on a particular application. In general, silicone rubbers exhibit poor mold release characteristics. Typically, silicone rubber is pressure molded and vulcanized in a metal mold and then removed from the mold. The molded silicone rubber article often fails upon mold parting due to poor mold release characteristics.

For ease of removal of molded parts from the mold, various attempts including plating of chromium and coating of Teflon resin to the surface of the metal mold have been made with less satisfactory results. It is also known to apply lubricants such as surface active agents, halocarbon polymers and talc to the metal mold. This technique, however, is undesirable because of complexity added to the overall process since the lubricant coatings do not last and repetitive applications are necessary and because of the adverse influence on the quality of molded parts. Further it is proposed to add metal carboxylates to silicone rubber compositions for improving mold release characteristics as disclosed in U.S. Pat. No. 3,549,744 and Japanese Patent Publication No. 45099/1980. Undesirable compression set is left in the resulting silicone rubber and the addition of a substantial amount of metal carboxylate gives rise to a safety problem. In addition, mold release is improved to only a limited extent.

The silicone rubber has another drawback in that since organopolysiloxanes have low intermolecular forces, their compositions are limp and easy to masticate, but do not smoothly separate from the rolls resulting in inefficient operations. As solutions to this problem it has been proposed, for example, to add higher fatty acid metal salts as disclosed in Japanese Patent Publication No. 19951/1980, to add higher fatty acids as disclosed in Japanese Patent Application Kokai No. 44655/1982, and to add fatty acids or esters, metal salts or amides thereof along with polytetrafluoroethylene as disclosed in Japanese Patent Application Kokai Nos. 27749/1983 and 194949/1983. Mold release is not satisfactory in some attempts and some adversely affect heat resistance.

In turn, conductor wires are prepared by extrusion molding silicone rubber on a copper or tin-plated copper core conductor. Undesirably, the silicone rubber is closely bonded to the core conductor as time goes by at elevated temperatures. One known solution to this problem is to add fatty acids or fatty acid metal salts as disclosed in Japanese Patent Application Kokai Nos. 159850/1982 and 159851/1982. This solution, however, is not satisfactory in preventing the silicone rubber coating from bonding to the core conductor at elevated temperatures in excess of 200° C.

Also, silicone rubber is used in contact with glass. The silicone rubber is closely bonded to glass with the lapse of time. If one attempts to separate them, the silicone rubber would fail or part of the silicone rubber is left attached to the glass surface.

SUMMARY OF THE INVENTION

Therefore, a primary object of the present invention is to provide a silicone rubber composition which has overcome the above-mentioned problems associated with mold parting of silicone rubber while maintaining the essential mechanical and thermal properties thereof. Another object is to provide a silicone rubber resulting from such a composition.

We have found that when (A) an organopolysiloxane having the following average composition formula:

$$R^1_a SiO_{(4-a)/2} \tag{1}$$

wherein $R^1$ is a hydroxyl group or a substituted or unsubstituted monovalent hydrocarbon group having 1 to 10 carbon atoms, and letter a is a positive number of from 1.95 to 2.05 is blended with (B-i) a silane having the general formula:

$$Rf_b R^2_c (R^3-\overset{\overset{\displaystyle O}{\|}}{C}-O-)_d Si \tag{2}$$

wherein Rf is a monovalent hydrocarbon group having at least 3 carbon atoms with at least one hydrogen atom substituted with a fluorine atom, $R^2$ is an unsubstituted monovalent hydrocarbon group having 1 to 20 carbon atoms, $R^3$ is a substituted or unsubstituted monovalent hydrocarbon group having 5 to 30 carbon atoms, letter b is equal to 1 or 2, c is equal to 0, 1 or 2, d is equal to 1 or 2, and (b+c+d)=4 and/or (B-ii) an organopolysiloxane having the following average composition formula:

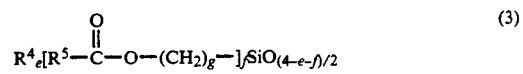

$$R^4_e[R^5-\overset{\overset{\displaystyle O}{\|}}{C}-O-(CH_2)_g-]_f SiO_{(4-e-f)/2} \tag{3}$$

wherein $R^4$ is a hydrogen atom or a monovalent organic group having 1 to 20 carbon atoms, $R^5$ is a substituted or unsubstituted monovalent hydrocarbon group having 5 to 30 carbon atoms, f/e ranges from 1/1 to 1/50, $1.95 \leq (e+f) < 4$, preferably $1.95 \leq (e+f)$ 3.4, and g is an integer of from 0 to 10, preferably in an amount of 0.03 to 5 parts by weight of silane (B-i) and/or organopolysiloxane (B-ii) per 100 parts by weight of organopolysiloxane (A), there can be produced a silicone rubber substantially improved over the prior art silicone rubbers having conventional mold release agents in the form of fatty acids or metal salts or amides thereof blended therein with respect to metal mold release, roll separation, core conductor separation, and glass separation because the silane (B-i) having both a fluorinated monovalent hydrocarbon group and an alkanoyloxy group in its molecule or the organopolysiloxane (B-ii) having an alkanoyloxy or alkanoyloxyalkyl group in its molecule can impart release ability. Since addition of component (B) little detracts from the mechanical and thermal properties of the base organopolysiloxane, the resultant silicone rubber maintains the mechanical and thermal properties inherent to silicone rubber.

Therefore, the silicone rubber composition which attains the above and other objects according to the teachings of the present invention includes, in admixture, (A) an organopolysiloxane of formula (1) and (B)

at least one member selected from (B-i) a silane of formula (2) and (B-ii) an organopolysiloxane of formula (3), all of the formulae being defined above.

BRIEF DESCRIPTION OF THE DRAWING

The figure schematically shows a roll separation test.

DETAILED DESCRIPTION OF THE INVENTION

The major component of the silicone rubber composition of the present invention is (A) an organopolysiloxane having average composition formula (1).

$$R^1_a SiO_{(4-a)/2} \tag{1}$$

In formula (1), $R^1$ is a hydroxyl group or a substituted or unsubstituted monovalent hydrocarbon group having 1 to 10 carbon atoms, preferably 1 to 8 carbon atoms, for example, alkyl groups such as methyl, ethyl, propyl and butyl, alkenyl groups such as vinyl, allyl and butenyl, aryl groups such as phenyl and tolyl, aralkyl groups such as benzyl and β-phenylethyl, and substituted ones of these groups in which all or some of the hydrogen atoms attached to carbon atoms are replaced by halogen atoms or cyano groups, such as chloromethyl, chloropropyl, 3,3,3-trifluoropropyl and 2-cyanoethyl. Letter a is a positive number of from 1.95 to 2.05, preferably 1.98 to 2.02.

The organopolysiloxane preferably has a linear molecular structure although a partially branched structure is also acceptable. Preferred polysiloxanes are end blocked with a triorganosilyl or hydroxyl group. Examples of the end-blocking triorganosilyl group include trimethylsilyl, dimethylvinylsilyl, methylphenylvinylsilyl, methyldiphenylsilyl, methylvinylsilyl, and trivinylsilyl groups. Component (A) or organopolysiloxanes may have a varying degree of polymerization although those having a viscosity of at least 300 centistokes at 25° C., especially 10,000 to 100,000,000 centistokes at 25° C. are preferred.

Component (B) is (B-i) a silane, (B-ii) an organopolysiloxane, or a mixture of silane (B-i) and organopolysiloxane (B-ii). The silane (B-i) used herein is a silane of the following general formula:

$$Rf_b R^2_c (R^3-\overset{\overset{\displaystyle O}{\|}}{C}-O-)_d Si \tag{2}$$

having both a fluorinated hydrocarbon group and an alkanoyloxy group in its molecule.

In formula (2), Rf is a monovalent hydrocarbon group having at least 3 carbon atoms, preferably 3 to 30 carbon atoms, more preferably 3 to 20 carbon atoms, in which at least one hydrogen atom, preferably 3 to 61 hydrogen atoms, more preferably 3 to 41 hydrogen atoms are substituted with fluorine atoms, for example, 3,3,3-trifluoropropyl, $C_4F_9C_2H_4-$, and $C_7F_{15}C_2H_4-$. $R^2$ is an unsubstituted monovalent hydrocarbon group having 1 to 20 carbon atoms, preferably 1 to 8 carbon atoms, for example, alkyl groups such as methyl, ethyl, propyl, butyl, hexyl and cyclohexyl, alkenyl groups such as vinyl and allyl, and aryl groups such as phenyl. In the alkanoyloxy group:

$$R^3-\overset{\overset{\displaystyle O}{\|}}{C}-O-,$$

$R^3$ is a substituted or unsubstituted monovalent hydrocarbon group having 5 to 30 carbon atoms, preferably 7 to 20 carbon atoms for dispersion in the base silicone and release properties, for example, $C_7H_{15}-$, $C_9H_{19}-$, $C_{13}H_{27}-$, $C_{17}H_{33}-$, and $C_{17}H_{35}-$. The proportion of these substituents to the silicon atom are represented by letters b, c and d. Letter b is equal to 1 or 2, c is equal to 0, 1 or 2, d is equal to 1 or 2, and (b+c+d)=4.

The silanes of formula (2) may be used alone or in admixture of two or more as component (B). Preferred are those silanes having the following formula:

$$Rf(CH_3)Si(-O-\overset{\overset{\displaystyle O}{\|}}{C}-R^{3'})_2 \tag{4}$$

wherein Rf is as defined above and $R^{3'}$ is a substituted or unsubstituted monovalent hydrocarbon radical having 7 to 20 carbon atoms.

The other member which can be used as component (B) is an organopolysiloxane of the following average composition formula:

$$R^4_e[R^5-\overset{\overset{\displaystyle O}{\|}}{C}-O-(CH_2)_g-]_f SiO_{(4-e-f)/2} \tag{3}$$

having an alkanoyloxy or alkanoyloxyalkyl group in its molecule.

In formula (3), $R^4$ is a hydrogen atom or a monovalent organic group having 1 to 20 carbon atoms, preferably 1 to 8 carbon atoms, for example, an alkyl group such as methyl, ethyl, propyl, butyl, hexyl and cyclohexyl, an aryl group such as phenyl, an alkenyl group such as vinyl and allyl, a nitrile group, and a substituted group as exemplified for Rf such as 3,3,3-trifluoropropyl. In the alkanoyloxy or alkanoyloxyalkyl group:

$$R^5-\overset{\overset{\displaystyle O}{\|}}{C}-O(CH_2)_g-,$$

$R^5$ is a substituted or unsubstituted monovalent hydrocarbon group having 5 to 30 carbon atoms, preferably 7 to 20 carbon atoms for dispersion in the base silicone and release properties, for example, $C_7H_{15}-$, $C_9H_{19}-$, $C_{13}H_{27}-$, $C_{17}H_{33}-$, and $C_{17}H_{35}-$, and g is an integer of from 0 to 10, preferably from 0 to 6. In formula (3), f/e ranges from 1/1 to 1/50, which means that the proportion of the alkanoyloxy or alkanoyloxyalkyl group in the entire substituents in formula (3) ranges from 2 to 50 mol % because organopolysiloxane (B-ii) becomes well dispersible in the base silicone and imparts satisfactory release properties. It is to be noted that (e+f) is equal to a positive number in the range of from 1.95 to less than 4, preferably from 1.95 to 3.4.

The organopolysiloxane of formula (3) may have various structures including one having an alkanoyloxy group at either end, one having an alkanoyloxy group at an intermediate, and one having alkanoyloxy groups at either end and at an intermediate. Preferably, the one having an alkanoyloxy group at either end is of the formula:

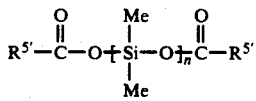

(6)

wherein Me is methyl, $R^{5'}$ is a substituted or unsubstituted monovalent hydrocarbon group having 7 to 20 carbon atoms, and n is a positive number of from 1 to 10, preferably from 1.5 to 10.

The one having an alkanoyloxy group at an intermediate is the formula:

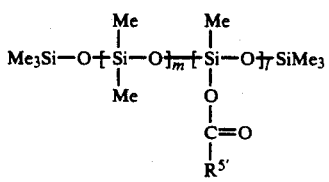

(7)

wherein Me and $R^{5'}$ are as defined above, and l and m are positive numbers, l/m ranges from 1/1 to 1/10, and l ranges from 1 to 100, preferably from 2 to 50.

The one having alkanoyloxy groups at either end and at an intermediate is of the following formula:

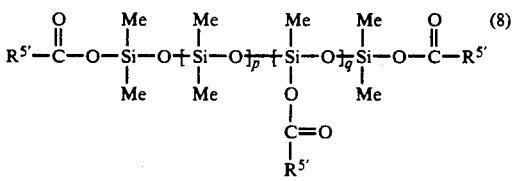

(8)

wherein Me and $R^{5'}$ are as defined above, and p and q are positive numbers, q/p ranges from 2/1 to 1/20, and q ranges from 0.01 to 100, preferably from 0.01 to 50.

The organopolysiloxane having an alkanoyloxyalkyl group is preferably of the following formula:

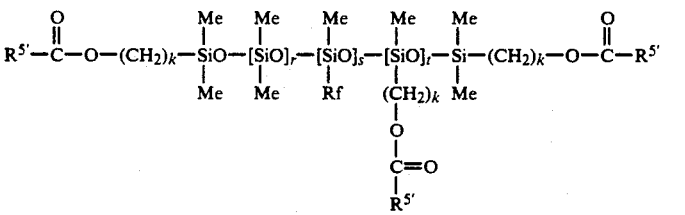

(9)

wherein Me, Rf and $R^{5'}$ are as defined above, k is an integer of from 1 to 10, r, s and t are positive numbers t/(r+s) ranges from 2/1 to 1/10, and t ranges from 1 to 100, preferably from 1 to 50.

The amount of component (B) blended ranges from 0.03 to 5 parts by weight, preferably from 0.03 to 1 part by weight per 100 parts by weight of component (A). Less than 0.03 parts by weight of component (B) is ineffective to provide desired release properties whereas more than 5 parts by weight of component (B) provides no further advantage in release properties and rather detracts from the silicone rubber's own heat resistance and other properties. The silanes of formula (2) and the organopolysiloxanes of formula (3) may be used alone or in admixture of both types.

The silicone rubber composition of the invention may contain a finely divided silica filler in addition to components (A) and (B). The silica filler is added for the purposes of reinforcement, thickening, processing aid and extension. Examples of the silica filler include fumed silica, wet silica, fumed silica and wet silica both rendered hydrophobic on the surface, quartz powder and diatomaceous earth. Preferably, the silica filler has a specific surface area of at least 1 m²/g, preferably from 1 to 800 m²/g. It is preferably blended in an amount of 5 to 500 parts by weight, more preferably 10 to 300 parts by weight per 100 parts by weight of organopolysiloxane (A). Less than 5 parts by weight of the silica filler provides little reinforcement or processing improvement whereas more than 500 parts by weight results in a drastic lowering of processability including mold flow and discharge.

The silicone rubber composition of the invention can be cured with a curing catalyst. Organic peroxides are preferably used as the catalyst. The organic peroxides are selected from those commonly used for promoting thermal curing of silicon rubber compositions, for example, benzoyl peroxide, monochlorobenzoyl peroxide, 2,4-dichlorobenzoyl peroxide, t-butylperbenzoate, dicumyl peroxide, 2,5-bis(t-butylperoxy) 2,5-dimethylhexane, 2,5-bis(t-butylperoxy)-2,5-dimethylhexyne. They may be used alone or in admixture of two or more, typically in an amount of 0.1 to 5 parts by weight per 100 parts by weight of organopolysiloxane (A).

In addition to the above-mentioned components, the silicone rubber composition of the invention may contain any other additives which are commonly added to conventional silicone rubber compositions, if desired, for example, dispersants such as low molecular weight siloxanes having a degree of polymerization of up to 100, silanol-bearing silanes, and alkoxy-bearing silanes; heat resistance modifiers such as iron oxide, cerium oxide, iron octylate and titanium oxide; pigments for coloring; flame retardants such as platinum and palladium compounds; and the like.

The resulting silicone rubber compositions can be molded into any desired configurations including pipe, sheet, profile and conductor configurations by general rubber molding techniques such as compression molding, extrusion molding, calendering, transfer molding, and injection molding, and then vulcanized by any conventional techniques for crosslinking and curing into molded silicone rubber articles. Often, primary curing conditions include atmospheric pressure, a temperature of 100 to 400° C., and a time of 30 seconds to 1 hour, and optional secondary curing conditions include a temperature of 150 to 200° C. and a time of 0 to 24 hour. It is to be noted that the order of adding the components to prepare the composition is not critical and they may be blended in a conventional order and manner.

There has been described a silicone rubber composition comprising organopolysiloxane (A) and silane and/or organopolysiloxane (B). Since component (B) enhances the release properties of the composition, the composition can be easily separated from the mill rolls to insure efficient operation and silicone rubber articles cured from the composition can be removed from the mold with the minimized risk of failure. When the composition is contacted with conductors or glass, the composition does not adhere to such substrates, but ensures easy parting. In addition, the cured articles retain the silicon rubber's own mechanical and thermal properties. The composition and the resulting silicone rubber will find a wide variety of applications.

K.K.) and 4 parts of diphenylsilane diol as a dispersant. The mixture was uniformly blended, heat treated at 150° C. for 4 hours, and then milled and plasticized in a two-roll rubber mill, obtaining a base compound. This is designated base compound A.

Release Agent

Several release agents belonging to component (B) were used in Examples. Their structural formulae are shown in Table 1.

TABLE 1

| | |
|---|---|
| Release agent 1 | $C_{17}H_{33}-CO-(Si(Me)_2-O)_{11.5}-C-C_{17}H_{33}$ with C=O at both ends |
| Release agent 2 | $Me_3Si-O-(Si(Me)_2-O)_{175}-(Si(Me)(OC(O)C_{13}H_{27})-O)_{25}-SiMe_3$ |
| Release agent 3 | $C_9H_{19}-CO-(Si(Me)_2-O)_{11.3}-(Si(Me)(OC(O)C_9H_{19})-O)_{0.14}-C-C_9H_{19}$ with C=O at both ends |
| Release agent 4 | $Me_3Si-O-(Si(Me)_2-O)_{175}-(Si(Me)(OC(O)C_9H_{19})-O)_{25}-SiMe_3$ |
| Release agent 5 | $C_4F_9-C_2H_4-Si(Me)(-O-C(=O)-C_{13}H_{27})_2$ |
| Release agent 6 | $C_{17}H_{35}CO-C_3H_6-SiO-(SiMe_2-O)_{36}-(Si(Me)(OC(O)C_{17}H_{35})-O)_{18}-(Si(Me)(C_2H_4CF_3)-O)_{8}-SiMe_2-C_3H_6-O-C(=O)-C_{17}H_{35}$ |

EXAMPLE

In order that those skilled in the art better understand the present invention, examples of the invention are given below together with comparative examples by way of illustration and not by way of limitation. All parts are parts by weight. In structural formulae, Me is methyl.

EXAMPLES 1–8 and COMPARATIVE EXAMPLES 1–4

Base Compound

The following base compound was commonly used in Examples and Comparative Examples.

To 100 parts of an organopolysiloxane end-blocked with a dimethylvinylsilyl group at either end, consisting of 99.875 mol % of $(CH_3)_2SiO$ unit and 0.125 mol % of $(CH_2=CH)(CH_3)SiO$ unit, having a viscosity of $1 \times 10^7$ centistokes were added 40 parts of fumed silica (trade name: Aerogel 200, manufactured by Nihon Aerogel

Roll Separation Test

Eight silicone rubber compositions were prepared by adding the release agents and 2,5-bis(t-butylperoxy)-2,5-dimethylhexane vulcanizing agent to base compound A in the amounts reported in Table 2, and milling the mixtures in a two-roll rubber mill.

The compositions were tested for roll separation by the following procedure. A two-roll mill having two 6-inch diameter rolls 1 and 1 at a spacing of 2 mm as shown in the figure was used. The composition (100 grams) was milled in the mill for 2½ minutes and allowed to defoam for 1½ minutes. Then the rolls were again rotated for 3 minutes. After rotation of the rolls 1 was stopped, the sheet composition 2 was pulled by a suitable holder means with a force of 0.1 kgf in a tangential direction to the roll to measure the time required to separate the sheet composition 2 from the roll 1 over a circumferential distance of 10 cm between points A and B. The shorter the separating time, the better is the roll separation of the composition.

The results are shown in Table 2.

TABLE 2

| Composition | Example | | | | | | Comparison | |
|---|---|---|---|---|---|---|---|---|
| | E1 | E2 | E3 | E4 | E5 | E6 | CE1 | CE2 |
| Base compound A | 100 | 100 | 100 | 100 | 100 | 100 | 100 | 100 |
| Release agent 1 | 0.1 | — | — | — | — | — | — | — |
| Release agent 2 | — | 0.1 | — | — | — | — | — | — |
| Release agent 3 | — | — | 0.1 | — | — | — | — | — |
| Release agent 4 | — | — | — | 0.1 | — | — | — | — |
| Release agent 5 | — | — | — | — | 0.1 | — | — | — |
| Release agent 6 | — | — | — | — | — | 0.1 | — | — |
| Zinc stearate | — | — | — | — | — | — | — | 0.1 |
| 2,5-bis(t-butylperoxy)-2,5-dimethylhexane | 0.4 | 0.4 | 0.4 | 0.4 | 0.4 | 0.4 | 0.4 | 0.4 |
| Roll separating time, sec. | 14.8 | 21.6 | 27.8 | 25.6 | 16.3 | 26.8 | 52.4 | 34.0 |

As is evident from Table 2, the silicone rubber compositions falling within the scope of the invention are quickly separable from the roll.

Next, how the roll separation and mechanical properties of silicone rubber compositions vary with the amount of release agent added was examined.

Four silicone rubber compositions were prepared by adding the release agents and 2,5-bis(t-butylperoxy)-2,5-dimethylhexane vulcanizing agent to base compound A in the amounts reported in Table 3, and milling the mixtures in a two-roll rubber mill.

These compositions were subjected to the same roll separation test as above. Further, sheet specimens were prepared from the compositions by compression molding at 165° C. for 10 minutes and then post curing at 200° C. for 4 hours. The specimens were measured for mechanical properties according to JIS K-6301 both as cured and after a heat resistance test at 250° C. for 24 hours.

The results are shown in Table 3.

TABLE 3

| | Example | | Comparison | |
|---|---|---|---|---|
| | E1 | E7 | CE1 | CE2 |
| Composition, pbw | | | | |
| Base compound A | 100 | 100 | 100 | 100 |
| Release agent 1 | 0.1 | 1 | — | — |
| Zinc stearate | — | — | — | 0.1 |
| Vulcanizing agent | 0.4 | 0.4 | 0.4 | 0.4 |
| As cured | | | | |
| Hardness, JIS | 53 | 56 | 52 | 53 |
| Tensile strength, kgf/cm$^2$ | 116 | 104 | 119 | 118 |
| Elongation, % | 400 | 350 | 420 | 410 |
| After 24 hours @ 250° C. | | | | |
| Hardness change (point) | +5 | +7 | +1 | +3 |
| Tensile strength change (%) | −35 | −24 | −43 | −33 |
| Elongation change (%) | −33 | −37 | −21 | −26 |
| Roll separation time, sec. | 14.8 | 4.0 | 52.4 | 34.0 |

As is evident from Table 3, the silicone rubber compositions falling within the scope of the invention are quickly separable from the roll without a loss of mechanical properties.

Mold Release Test

Four silicone rubber compositions were prepared by adding the release agents and 2,5-bis(t-butylperoxy)-2,5-dimethylhexane vulcanizing agent to base compound A in the amounts reported in Table 4, and milling the mixtures in a two-roll rubber mill.

These compositions were tested for mold release by the following procedure. Using a compression stress relaxation tester (manufactured by Nihon Synthetic Rubber K.K.), the silicone rubber composition was molded into a disk of 25 mm diameter and 1 mm thick. Compression molding was done at 165° C. for 10 minutes, and the stress upon pressure release was detected using a load cell, the maximum being regarded as a mold releasing force.

The results are shown in Table 4.

TABLE 4

| | Example | | Comparison | |
|---|---|---|---|---|
| | E1 | E2 | CE1 | CE2 |
| Composition, pbw | | | | |
| Base compound A | 100 | 100 | 100 | 100 |
| Release agent 1 | 0.1 | — | — | — |
| Release agent 2 | — | 0.1 | — | — |
| Zinc stearate | — | — | — | 0.1 |
| Vulcanizing agent | 0.4 | 0.4 | 0.4 | 0.4 |
| Mold releasing force, kgf/cm$^2$ | 2.3 | 3.7 | 4.0 | 3.2 |

As is evident from Table 4, the silicone rubber compositions falling within the scope of the invention are lightly releasable from the mold after molding.

Core Conductor Adhesion Test

Three silicone rubber compositions were prepared by adding the release agents and 2,4-dichlorobenzoyl peroxide vulcanizing agent to base compound A in the amounts reported in Table 5, and milling the mixtures in a two-roll rubber mill.

These compositions were tested for adhesion to a core conductor upon manufacture of insulated conductors by the following procedure. The silicone rubber composition was compression molded over a stranded conductor (consisting of 20 tin-plated copper wires of diameter 0.18 mm) at 120° C. for 10 minutes to form a sheet of 4 mm thick having the conductor embedded therein. After post curing, the conductor was forcedly withdrawn from the sheet and the rubber remainder on the conductor was evaluated. The composition was rated "pass" when the conductor could be withdrawn smoothly without leaving rubber thereon, and "rejected" when the conductor could be withdrawn, but rubber left thereon or the conductor could not be withdrawn.

Further, sheet specimens were prepared from the compositions by compression molding at 120° C. for 10 minutes and then post curing at 150° C. for 1 hour. The specimens were measured for mechanical properties according to JIS K-6301 both as cured and after a heat resistance test at 220° C. for 96 hours.

The results are shown in Table 5.

TABLE 5

|  | Example | Comparison | |
|---|---|---|---|
|  | E8 | CE3 | CE4 |
| Composition, pbw |  |  |  |
| Base compound A | 100 | 100 | 100 |
| Release agent 4 | 0.1 | — | — |
| Zinc stearate | — | — | 0.1 |
| Vulcanizing agent | 0.7 | 0.7 | 0.7 |
| As cured |  |  |  |
| Hardness, JIS | 51 | 51 | 51 |
| Tensile strength, kgf/cm$^2$ | 147 | 145 | 147 |
| Elongation, % | 490 | 500 | 490 |
| After 96 hours @ 220° C. |  |  |  |
| Hardness change (point) | +5 | +6 | +6 |
| Tensile strength change (%) | −30 | −29 | −33 |
| Elongation change (%) | −32 | −31 | −34 |
| Core conductor adhesion |  |  |  |
| Initial | Pass | Pass | Pass |
| 200° C./1 hr. | Pass | Rejected | Pass |
| 200° C./4 hr. | Pass | Rejected | Pass |
| 200° C./8 hr. | Pass | Rejected | Rejected |

As is evident from Table 5, the silicone rubber compositions falling within the scope of the invention are improved in conductor adhesion inhibition during insulated conductor manufacture without a loss of mechanical properties.

Glass Adhesion Test

Three silicone rubber compositions were prepared by adding the release agents and 2,5-bis(t-butylperoxy)-2,5-dimethylhexane vulcanizing agent to base compound A in the amounts reported in Table 6, and milling the mixtures in a two-roll rubber mill.

Sheet specimens of 0.8 mm thick were prepared from the compositions by compression molding at 165° C. for 10 minutes and then post curing at 200° C. for 4 hours. The specimens were placed in close contact with plate glass and allowed to stand at room temperature for a predetermined time. Finally, the sheet was peeled from the glass. The composition was rated "pass" when the sheet could be perfectly peeled from the glass, and "rejected" when some rubber was left on the glass after peeling.

The results are shown in Table 6.

TABLE 6

|  | Example | Comparison | |
|---|---|---|---|
|  | E1 | CE1 | CE2 |
| Composition, pbw |  |  |  |
| Base compound A | 100 | 100 | 100 |
| Release agent 1 | 0.1 | — | — |
| Zinc stearate | — | — | 0.1 |
| Vulcanizing agent | 0.4 | 0.4 | 0.4 |
| Glass adhesion |  |  |  |
| After 1 day | Pass | Pass | Pass |
| After 7 days | Pass | Rejected | Pass |
| After 30 days | Pass | Rejected | Rejected |

As is evident from Table 6, the silicone rubber compositions falling within the scope of the invention are improved in glass adhesion inhibition.

Although some preferred embodiments have been described, many modifications and variations may be made thereto in the light of the above teachings. It is therefore to be understood that within the scope of the appended claims, the invention may be practiced otherwise than as specifically described.

We claim:

1. A silicone rubber composition comprising
   (A) 100 parts by weight of an organopolysiloxane having the following average composition formula:

$$R^1_a SiO_{(4-a)/2} \quad (1)$$

wherein $R^1$ is a substituted or unsubstituted monovalent hydrocarbon group having 1 to 10 carbon atoms, and letter a is a positive number of from 1.95 to 2.05,
   said organopolysiloxane being end blocked with a triorganosilyl or hydroxy group,
   (B) 0.03 to 5 parts by weight of at least one member selected from the class consisting of
   (B-i) a silane having the general formula:

$$Rf_b R^2_c (R^3-\overset{O}{\underset{\|}{C}}-O-)_d Si \quad (2)$$

wherein Rf is a monovalent hydrocarbon group having at least 3 carbon atoms with at least one hydrogen atom substituted with a fluorine atom, $R^2$ is an unsubstituted monovalent hydrocarbon group having 1 to 20 carbon atoms, $R^3$ is a substituted or unsubstituted monovalent hydrocarbon group having 5 to 20 carbon atoms, letter b is equal to 1 or 2, c is equal to 0, 1 or 2, d is equal to 1 or 2, and (b+c+d)=4 and
   (B-ii) an organopolysiloxane having the following average, composition formula:

$$R^4_e [R^5-\overset{O}{\underset{\|}{C}}-O-(CH_2)_g-]_f SiO_{(4-e-f)/2} \quad (3)$$

wherein $R^4$ is a hydrogen atom or a monovalent organic group having 1 to 20 carbon atoms, $R^5$ is a substituted or unsubstituted monovalent hydrocarbon group having 5 to 30 carbon atoms, f/e ranges from 1/1 to 1/50, $1.95 \leq (e+f) < 4$, and g is an integer of from 0 to 10, and
   (C) 0.1 to 5 parts by weight of an organic peroxide per 100 parts by weight of component (A).

2. The silicone rubber composition of claim 1 wherein $R^1$ of formula (1) is a substituted or unsubstituted monovalent hydrocarbon group having 1 to 10 carbon atoms selected from the class consisting of alkyl, aryl, aralkyl and halogen or cyano substituted derivatives thereof, letter a is a positive number of from 1.98 to 2.02.

3. The silicone rubber composition of claim 1 wherein $R^1$ of formula (1) is selected from the class consisting of methyl, ethyl, propyl, butyl, vinyl, allyl, butenyl, phenyl, tolyl, benzyl, β-phenylethyl, chloromethyl, chloropropyl, 3,3,3-trifluoropropyl and 2-cyanoethyl, and letter a is a positive number of from 1.95 to 2.05.

4. The silicone rubber composition of claim 1 wherein aid organopolysiloxane being end blocked with a trimethylsilyl, dimethylvinylsilyl, methylphenylsilyl, methyldiphenylsilyl, methylvinylsilyl or trivinylsilyl group.

5. The silicone rubber composition of claim 1 wherein in formula (2), Rf is 3,3,3-trifluoropropyl, $C_4F_9C_2H_4-$ or $C_7F_{15}C_2H_4-$, $R^2$ is methyl, propyl, butyl, hexyl, cyclohexyl, vinyl, allyl or phenyl and $R^3$ is $C_7H_{15}-$, $C_9H_{19}-$, $C_{13}H_{19}-$, $C_{13}H_{27}-$, $C_{17}H_{33}-$ or $C_{17}H_{35}-$.

6. The silicone rubber composition of claim 1 wherein in formula (3), $R^4$ is a hydrogen atom, a methyl, ethyl, propyl, butyl, hexyl, cyclohexyl, phenyl, vinyl, allyl, nitrile or 3,3,3-trifluoropropyl group.

7. The silicone rubber composition of claim 1 wherein the silane of formula (2) is one having the following formula:

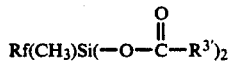  (4)

wherein Rf is as defined above and $R^{3'}$ is a substituted or unsubstituted monovalent hydrocarbon radical having 7 to 20 carbon atoms.

8. The silicone rubber composition of claim 1 wherein the organopolysiloxane of formula (3) is one having the following formula:

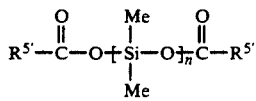  (6)

wherein Me is methyl, $R^{5'}$ is a substituted or unsubstituted monovalent hydrocarbon group having 7 to 20 carbon atoms, and n is a positive number of from 1 to 10.

9. The silicone rubber composition of claim 1 wherein the organopolysiloxane of formula (3) is one having the following formula:

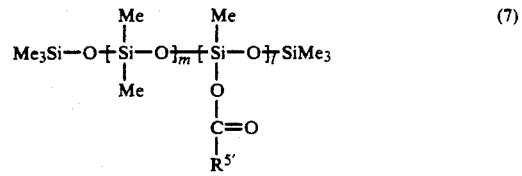  (7)

wherein Me is methyl, $R^{5'}$ is a substituted or unsubstituted monovalent hydrocarbon group having 7 to 20 carbon atoms, and l and m are positive numbers, l/m ranges from 1/1 to 10, and l ranges from 1 to 100.

10. The silicone rubber composition of claim 1 wherein the organopolysiloxane of formula (3) is one having the following formula:

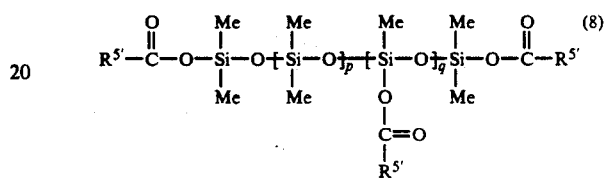  (8)

wherein Me is methyl, $R^{5'}$ is a substituted or unsubstituted monovalent hydrocarbon group having 7 to 20 carbon atoms, and p and q are positive numbers, q/p ranges from 2/1 to 20, and q ranges from 0.01 to 100.

11. The silicone rubber composition of claim 1 wherein the organopolysiloxane of formula (3) is one having the following formula:

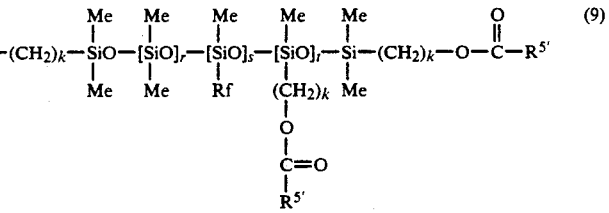  (9)

wherein Me is methyl, $R^{5'}$ is a substituted or unsubstituted monovalent hydrocarbon group having 7 to 20 carbon atoms, k is an integer of from 1 to 10, r, s and t are positive numbers, t/(r+s) ranges from 2/1 to 1/10, and t ranges from 1 to 100.

12. The silicone rubber composition of claim 1, comprising 100 parts by weight of component (A) and 0.03 to 5 parts by weight of component (B).

13. The silicone rubber composition of claim 1 which further comprises a silica filler in an amount of 5 to 500 parts by weight per 100 parts by weight of component (A).

14. A silicone rubber obtained by vulcanizing the composition of claim 1.

* * * * *